US012402562B2

(12) United States Patent
Smith et al.

(10) Patent No.: US 12,402,562 B2
(45) Date of Patent: Sep. 2, 2025

(54) HARVESTER REEL HAVING ADJUSTABLE TINE BARS AND METHOD FOR RESETTING SAME

(71) Applicant: CNH Industrial America LLC, New Holland, PA (US)

(72) Inventors: Kevin Smith, Narvon, PA (US); Cory Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 560 days.

(21) Appl. No.: 17/939,033

(22) Filed: Sep. 7, 2022

(65) Prior Publication Data

US 2024/0074352 A1    Mar. 7, 2024

(51) Int. Cl.
*A01D 57/03*    (2006.01)

(52) U.S. Cl.
CPC .................. *A01D 57/03* (2013.01)

(58) Field of Classification Search
CPC ........ A01D 57/12; A01D 34/14; A01D 57/02; A01D 57/03; A01D 57/22; A01D 57/20
See application file for complete search history.

(56) References Cited

U.S. PATENT DOCUMENTS

| 5,359,839 | A | 11/1994 | Parsons et al. |
| 6,530,202 | B1 | 3/2003 | Guyer |
| 6,591,598 | B2 | 7/2003 | Remillard et al. |
| 2015/0272003 | A1* | 10/2015 | Honey ............... A01D 57/03 56/181 |
| 2017/0311546 | A1* | 11/2017 | Jost ................... A01D 57/04 |
| 2020/0178464 | A1* | 6/2020 | Talbot ................ A01D 57/12 |
| 2020/0256437 | A1* | 8/2020 | Lehman .............. F16H 53/06 |

FOREIGN PATENT DOCUMENTS

| BR | 112020008293 B1 * | 10/2023 | ........... A01D 34/04 |
| EP | 2923557 A1 * | 9/2015 | ........... A01D 34/01 |
| EP | 3868196 A1 * | 8/2021 | ........... A01B 73/005 |
| EP | 4327644 A1 * | 2/2024 | ........... A01D 41/127 |
| WO | WO-2019234539 A1 * | 12/2019 | ........... A01D 34/283 |
| WO | WO-2021062552 A1 * | 4/2021 | ........... A01D 34/04 |

* cited by examiner

*Primary Examiner* — Joseph M Rocca
*Assistant Examiner* — Jose Antonio Martinez
(74) *Attorney, Agent, or Firm* — Buchanan Ingersoll & Rooney PC

(57) ABSTRACT

A harvester reel includes a reel tine bar having a follower and a tine. A cam assembly includes a primary cam, a linkage and a latch. The linkage has a first end that is connected to the primary cam and a second end that is connectable to the tine bar for guiding rotation of the tine bar. The latch selectively couples the second end of the linkage to the tine bar. In an unlatched configuration of the latch, the reel tine bar can pivot relative to the second end of the linkage, and in a latched configuration of the latch, the reel tine bar is non-rotatably connected to the second end of the linkage. A secondary cam has a surface that is configured to be contacted by the follower of the reel tine bar. Upon contacting the secondary cam, the follower moves the latch to the unlatched configuration.

19 Claims, 15 Drawing Sheets

HARVESTER REEL HAVING ADJUSTABLE TINE BARS AND METHOD FOR RESETTING SAME

BACKGROUND OF THE INVENTION

The present disclosure relates generally to a harvester reel for an agricultural harvester header having adjustable tine bars.

Harvester reels are used on agricultural harvesters to guide crops to a cutting apparatus, e.g., a cutterbar. Reel-cutterbar interference is a well-known problem in harvester headers equipped with a flexible cutterbar or a cutterbar that can move vertically with respect to the reel. If the cutterbar flexes upwardly far enough it can cut plastic reel tines or experience damage if it comes into contact with metal reel tines. Shortened plastic tines can be very costly to replace in wider headers due to the sheer number of tines that must be replaced, and cutterbar damage caused by metal tines can result in significant harvester downtime.

Described herein is a method for deploying and resetting the tines to prevent contact between the tines and the cutterbar.

SUMMARY OF THE INVENTION

In accordance with an exemplary embodiment, the present disclosure provides a harvester reel for an agricultural harvester header comprising:
(i) a central rotatable shaft;
(ii) a reel tine bar extending widthwise across the reel and connected to the central rotatable shaft for rotation therewith, the reel tine bar including a biasing member for biasing the reel tine bar to rotate about its central longitudinal axis, a follower operatively connected to the reel tine bar, and a tine; and
(iii) a cam assembly including:
a primary cam,
a linkage having a first end that is connected to the primary cam and a second end that is configured to be releasably connected to the tine bar for guiding rotation of the tine bar about its central longitudinal axis during rotation of the central rotatable shaft,
a latch for releasably connecting said second end of the linkage to the tine bar, wherein in an unlatched configuration of the latch, the reel tine bar can pivot relative to the second end of the linkage, and in a latched configuration of the latch, the reel tine bar is non-rotatably connected to the second end of the linkage, and
a secondary cam having a surface that is configured to be contacted by the follower of the reel tine bar, wherein upon contacting the secondary cam, the follower moves the latch from the latched configuration to the unlatched configuration.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings.

DETAILED DESCRIPTION OF THE DRAWINGS

Figure 1:
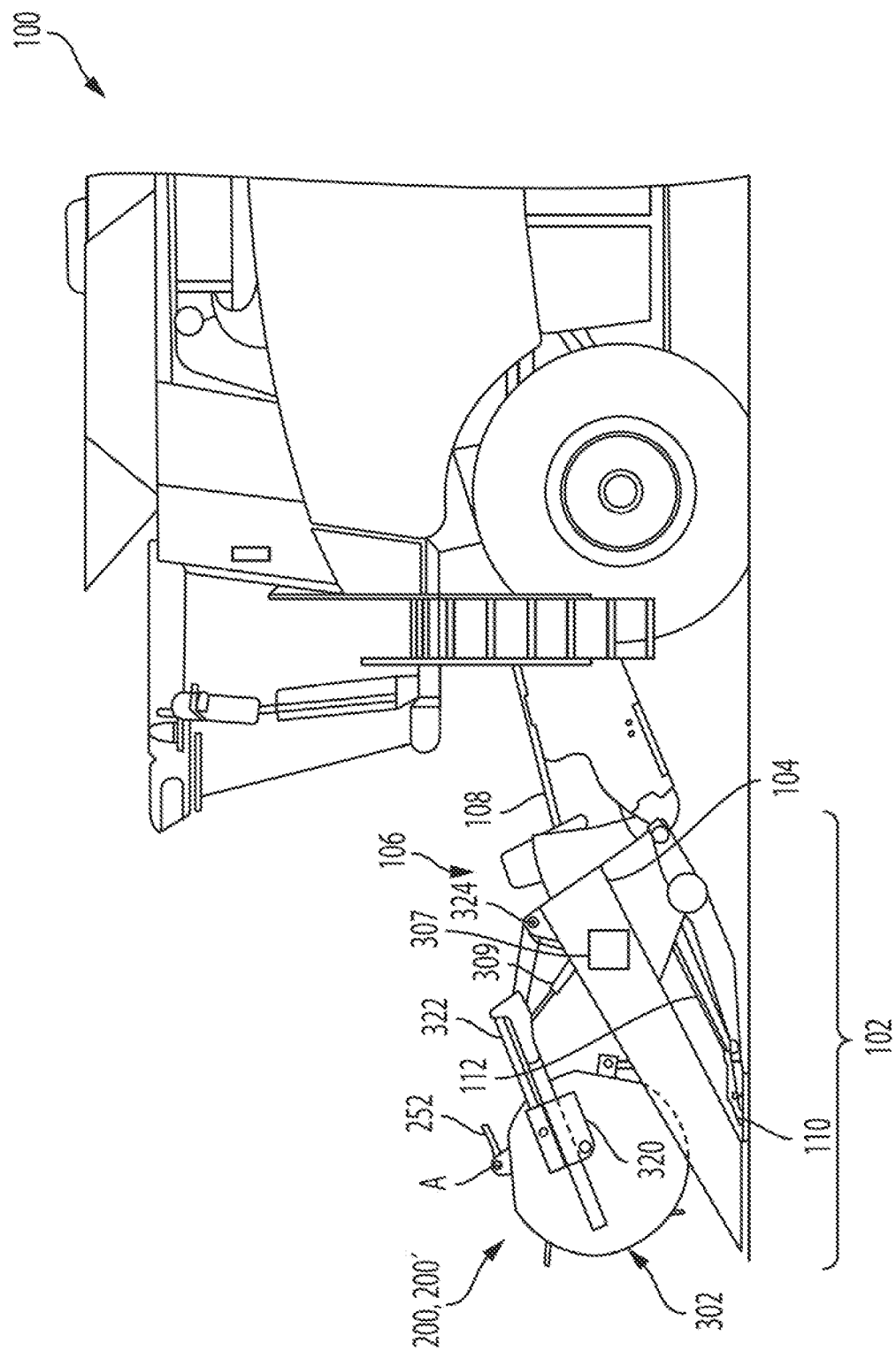
FIG. 1 is a side elevation view of an agricultural harvester in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the subject disclosure. The agricultural harvester e.g., a combine harvester 100, includes a header 102 having a chassis or frame 104 that is attached to a forward end 106 of the harvester. The header 102 is configured to cut crops with a cutterbar 110 as the harvester 100 moves forward over a crop field. It is appreciated that the cutterbar 110 includes one or more reciprocating sickles, such as those disclosed in U.S. Pat. No. 8,151,547, the entire disclosure of which is incorporated herein by reference for all purposes. The header includes a harvester reel 200, 200' and one or more draper belts, including draper belt 112 for moving crop materials towards a feederhouse 108.

Figure 2:
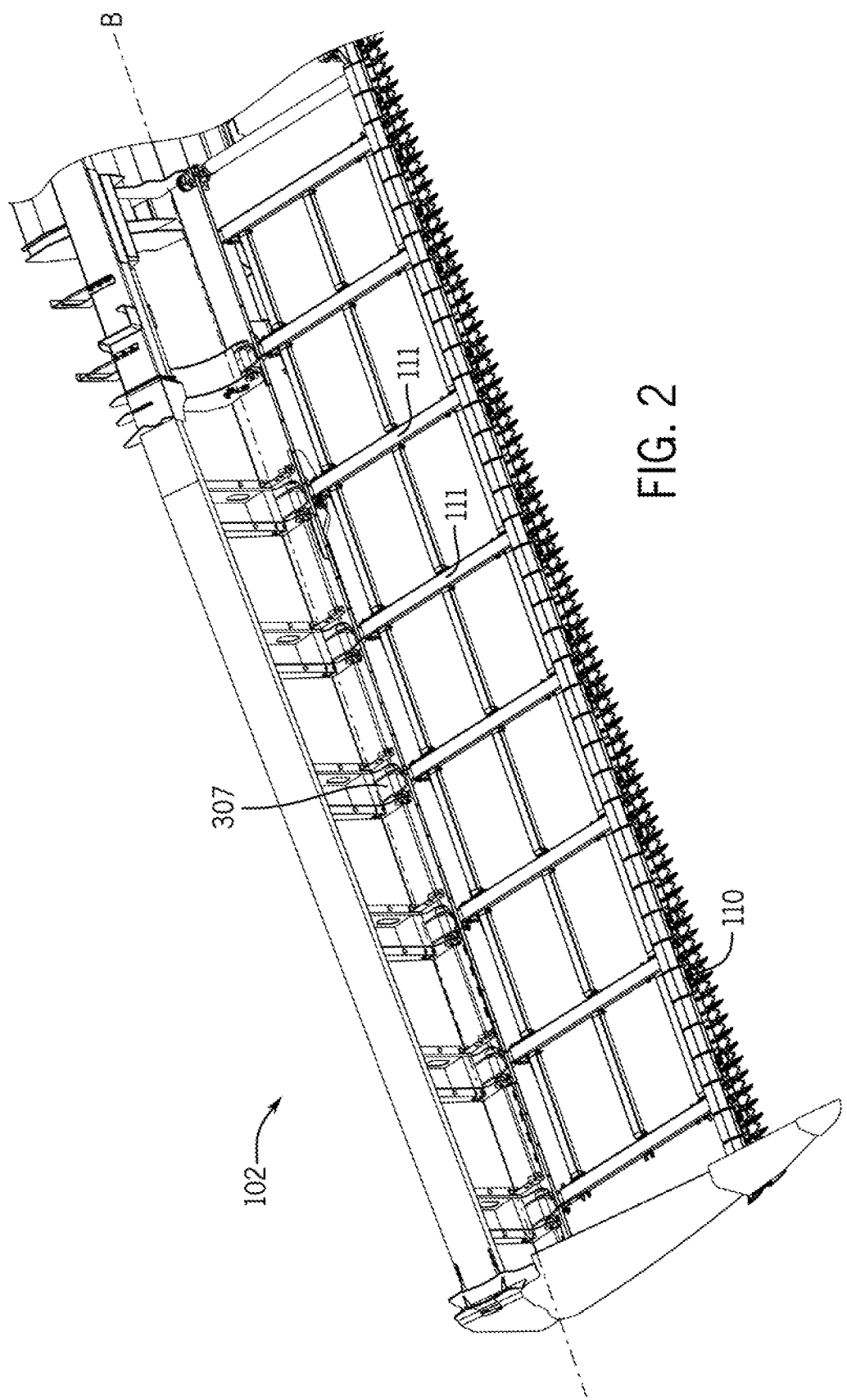
FIG. 2 is an isometric view of a portion of a header of the agricultural harvester of FIG. 1, whereby various components are omitted to reveal the flex arms of the header.

FIG. 2 depicts a portion of header 102 of harvester 100. Header 102 includes a frame, and a plurality of longitudinally extending flexible arms 111 mounted to the frame. Specifically, one end of each flex arm 111 is mounted to the frame, and the opposite end of each flex arm 111 is mounted to flexible and reciprocating cutterbar 110. Each flex arm 111 is rotatable mounted to the frame about axis B, such that the arms 111 can move as cutterbar 110 flexes upwardly and downwardly. Draper belt 112, which is omitted from FIG. 2, is supported both above and beneath flex arms 111, as is known in the art. Sensors 307 track the rotation (or position) of each flex arm 111; and that information is used to calculate the vertical position of cutterbar 110 with respect to the frame (or other stationary point). Specifically, because the length of a flex arm 111 is known and the degree of rotation of that flex arm 111 is sensed by sensor 307, the vertical position of the portion of cutterbar 110 that is mounted to that flex arm 11 can be determined using simple geometry. Alternatively, sensors 307 may be mounted to frame for monitoring the position of cutterbar 110 along its length. As yet another alternative, sensors 307 may be mounted along the length of the cutterbar 110 for monitoring the bending action of cutterbar 110 to thereby determine the vertical position of cutterbar 110 relative to the frame. It should be understood that various ways exist for determining the vertical position of cutterbar 110.

Sensors 307 may track the position of cutterbar 110 (based upon the position of flex arm 111), as described above. Alternatively, sensors 307 may track the position of reel 200, 200'. As another alternatively, sensors may track the gap between cutterbar 110 and reel 200, 200'. As yet another alternative, sensors 307 may track the position of cutterbar 110 (based upon the position of flex arm 111) and the position of reel 200, 200'. Each sensor 307 may be a rotary encoder (for detecting rotation), a potentiometer, an optical sensor, a Hall-effect sensor, a magnet, a switch, a magnetic sensor or any other type of sensor known to those skilled in the art for detecting movement.

The harvester reel 200, 200' is mounted on the header 102 and generally spans laterally or widthwise of the header. The harvester reel includes a central rotatable shaft or axle 202. A plurality of reel tine bars 206 extend widthwise across the reel and are connected to the central rotatable shaft for rotation therewith. Each of the plurality of reel tine bars is rotatable and includes a biasing member 250 (FIGS. 6 and 7) for biasing the reel tine bar about its central longitudinal axis "A" (FIG. 1) and at least one tine 252 for gathering and directing crop downwardly and rearwardly into the header 102 for subsequent cutting and harvesting operations. As shown in FIGS. 4, 5, 8 and 11, the harvester reel further includes a primary tine bar guiding mechanism 1000 configured to guide rotation of the tine bars during rotation of the central rotatable shaft, and a secondary tine bar guiding mechanism 1100 configured to guide rotation of the tine bars during a portion of a complete revolution of rotation of the central rotatable shaft. According to exemplary "cam reel" embodiments of the subject disclosure, the primary and secondary tine bar guiding mechanisms are incorporated into a cam assembly 300 (FIGS. 4 and 5) or 400 (FIGS. 8 and 11) at a lateral end of the harvester reel for guiding rotation of the plurality of tine bars.

The central rotatable shaft 202 is an axle powered by the header 102 to drive operations of the harvester reel. The central rotatable shaft supports the harvester reel and rotates about a longitudinal axis of the harvester reel.

Figure 5:
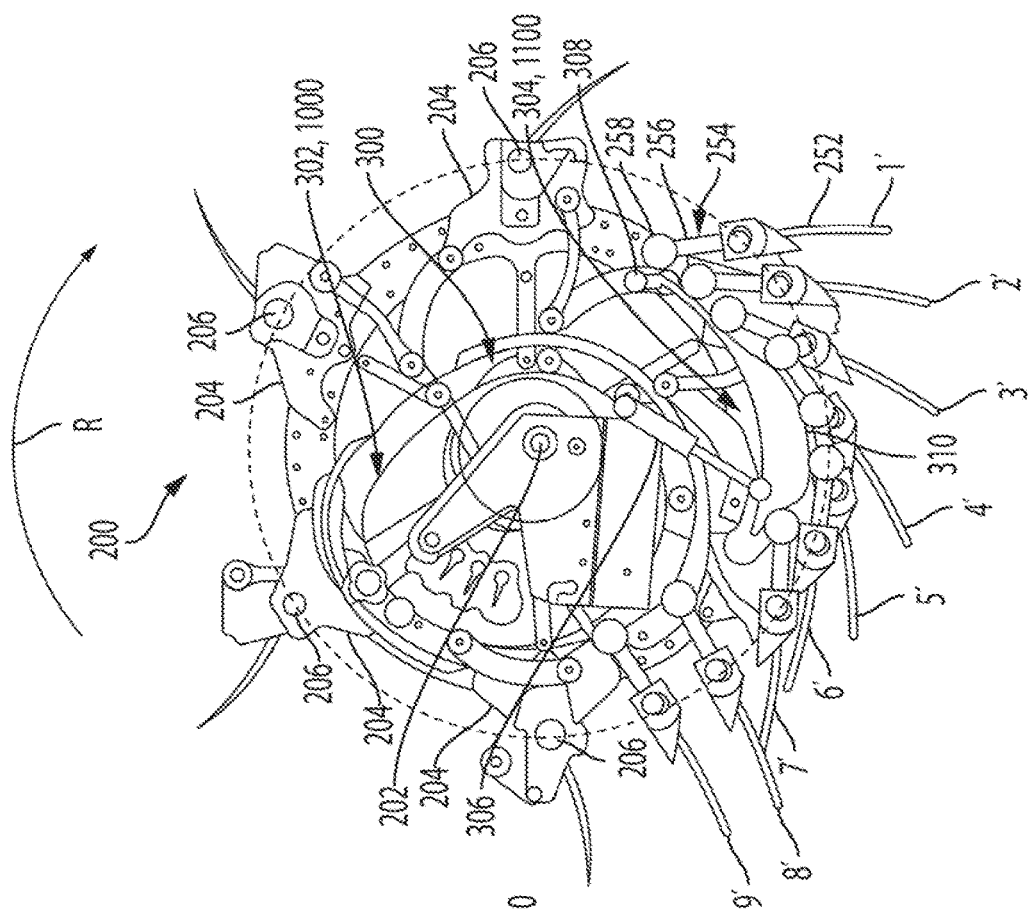
FIG. 5 is an external end view of a secondary cam of a reel cam assembly of a harvester reel in accordance with an exemplary embodiment of the subject disclosure in an engaged position.
Figure 4:
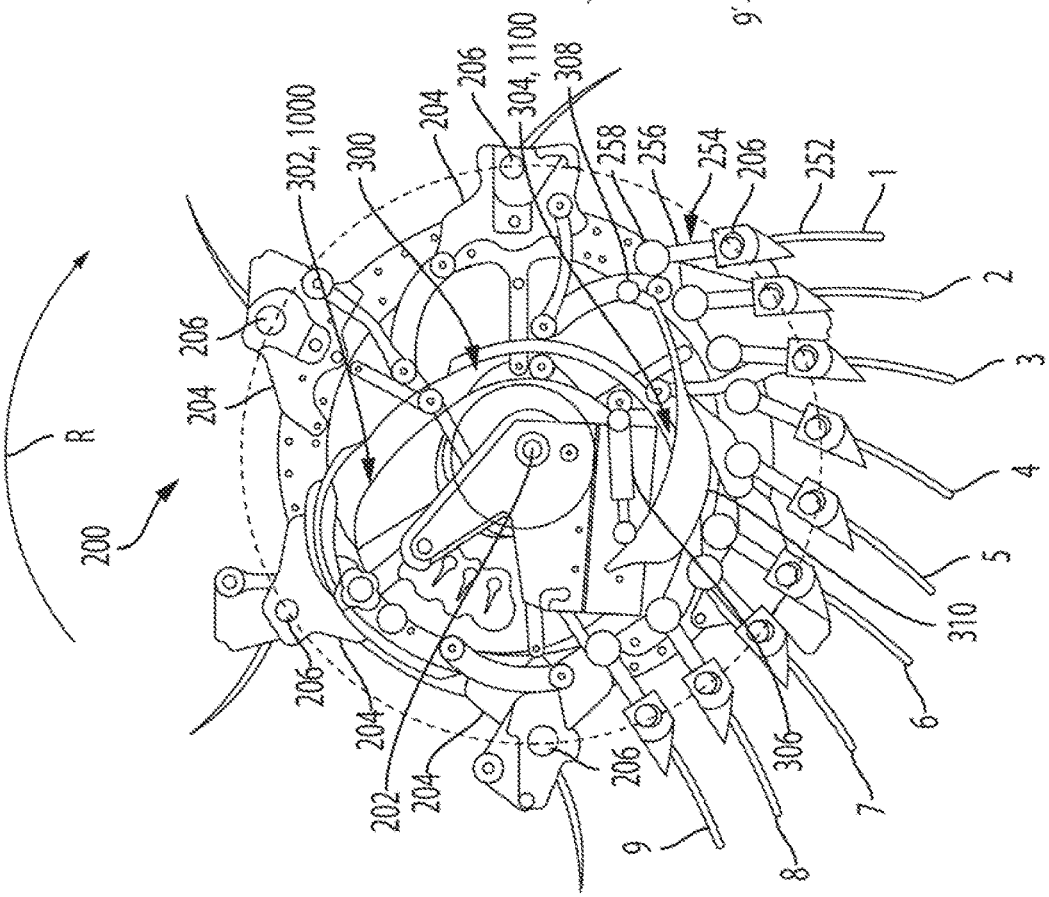
FIG. 4 is an external end view of a secondary cam of a reel cam assembly of a harvester reel in accordance with an exemplary embodiment of the subject disclosure in a disengaged position.
Figure 7:
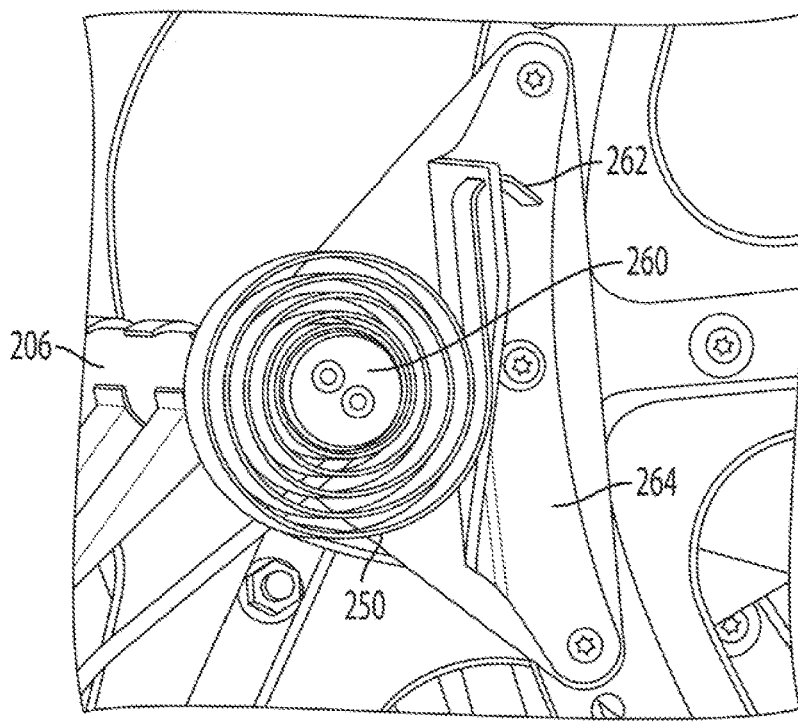
FIG. 7 is an enlarged perspective view of the end of the harvester reel shown in FIG. 6.

As best shown in FIGS. 4, 5 and 7, the plurality of tine bars 206 are circumferentially spaced about the central rotating shaft. The plurality of tine bars 206 extend lengthwise across the harvester reel and are connected to the central rotating shaft 202 via mounting brackets 204. Each of the mounting brackets 204 extend radially from the central rotating shaft 202. The harvester reel 200 is illustrated with six tine bars, however the harvester reel can include more or fewer than six tine bars, such as one, two, three, four, five, seven, eight, nine, ten, or more. FIGS. 4, 5, 8, 9, 11 and 12 illustrate that each of the plurality of tine bars includes a follower or cam follower 254 operatively attached to an end of the tine bar and extending substantially transverse to the central longitudinal axis of the tine bar. According to an aspect, each follower 254 comprises an elongated shaft or follower bracket 256 and a curved head 258, but can alternatively be a slider, a bearing, a bushing and the like suitable for the stated intended purpose. As described in greater detail below, when the follower moves or rotates it rotates or moves the tine bar to which it is connected.

Figure 6:
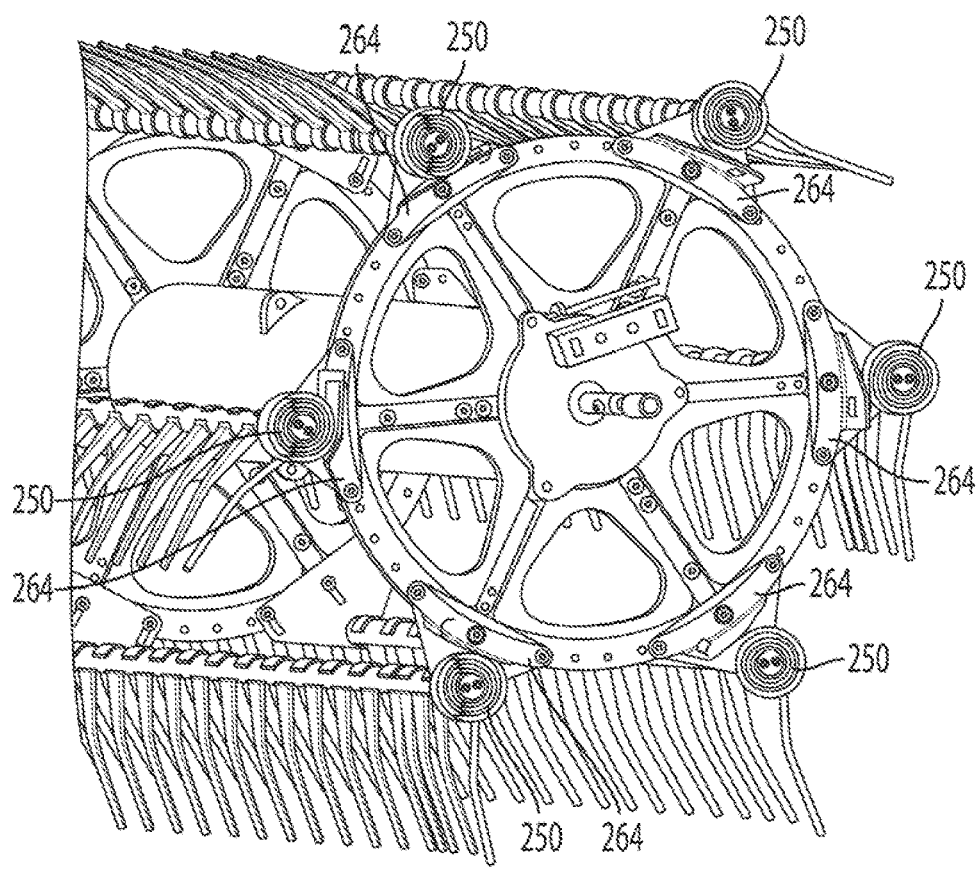
FIG. 6 is a perspective view of an end of a harvester reel in accordance with an exemplary embodiment of the subject disclosure.

As best shown in FIGS. 6 and 7, an end of each of the plurality of tine bars 206 includes the biasing member 250. As illustrated, the biasing member 250 is positioned at an end or lateral end of the reel opposite the end of the reel which carries the follower 254, although it is understood that the biasing member may be positioned at the same end of the reel which carries the follower 254 or any other suitable position along the length of the reel. According to an exemplary embodiment, the biasing member 250 is a torsion spring having a first end 260 affixed to the tine bar and a second end 262 engaged with a bracket 264 affixed to the reel. The biasing member can alternatively be an elastomer, a leaf spring, a coil spring, a gas spring and the like. As more fully described below, when the follower 254 is in an uncammed state, the biasing member 250 biases the tine bar to extend substantially radially outwardly from the perimeter of the harvester reel. In other words, the biasing member biases the tine bar to position the tine to extend substantially transverse to a tangent of a circumference defined by rotation of the tine bar about the central rotating shaft 202. Conversely, when the follower 254 is in a fully cammed state, the bias of the biasing member is overcome whereby the tine bar extends substantially tangentially to the perimeter of the harvester reel, or in other words the longitudinal axis of the tine extends at an acute angle relative to a circumference defined by rotation of the tine bar about the central rotating shaft 202.

The tines 252 are spaced apart along the length of each tine bar 206. According to exemplary embodiments, the tines can be fabricated from rigid material such as hard plastic or metal such as steel. The tines can range from about 3 to about 12 inches in length depending on the crop being harvested.

Referring again to FIG. 1, there is shown a primary cam 302 of a cam-type harvester reel, as well as structure for maintaining the primary cam stationary during rotation of the harvester reel 200. In particular, a bracket 320 is affixed to the cam 302 by unillustrated fasteners such as bolts, rivets, or the like. A distal portion of a reel lift arm 322 is secured to the bracket 320 and a proximal end of the reel lift arm is pivotably connected at 324 to the header frame 104. The connections of the primary cam to the bracket and the reel lift arm prevent rotation of the primary cam during rotation of the reel. The reel lift arm is raised and lowered by a reel lift arm actuator 309 such as a hydraulic cylinder or the like.

Figure 3:
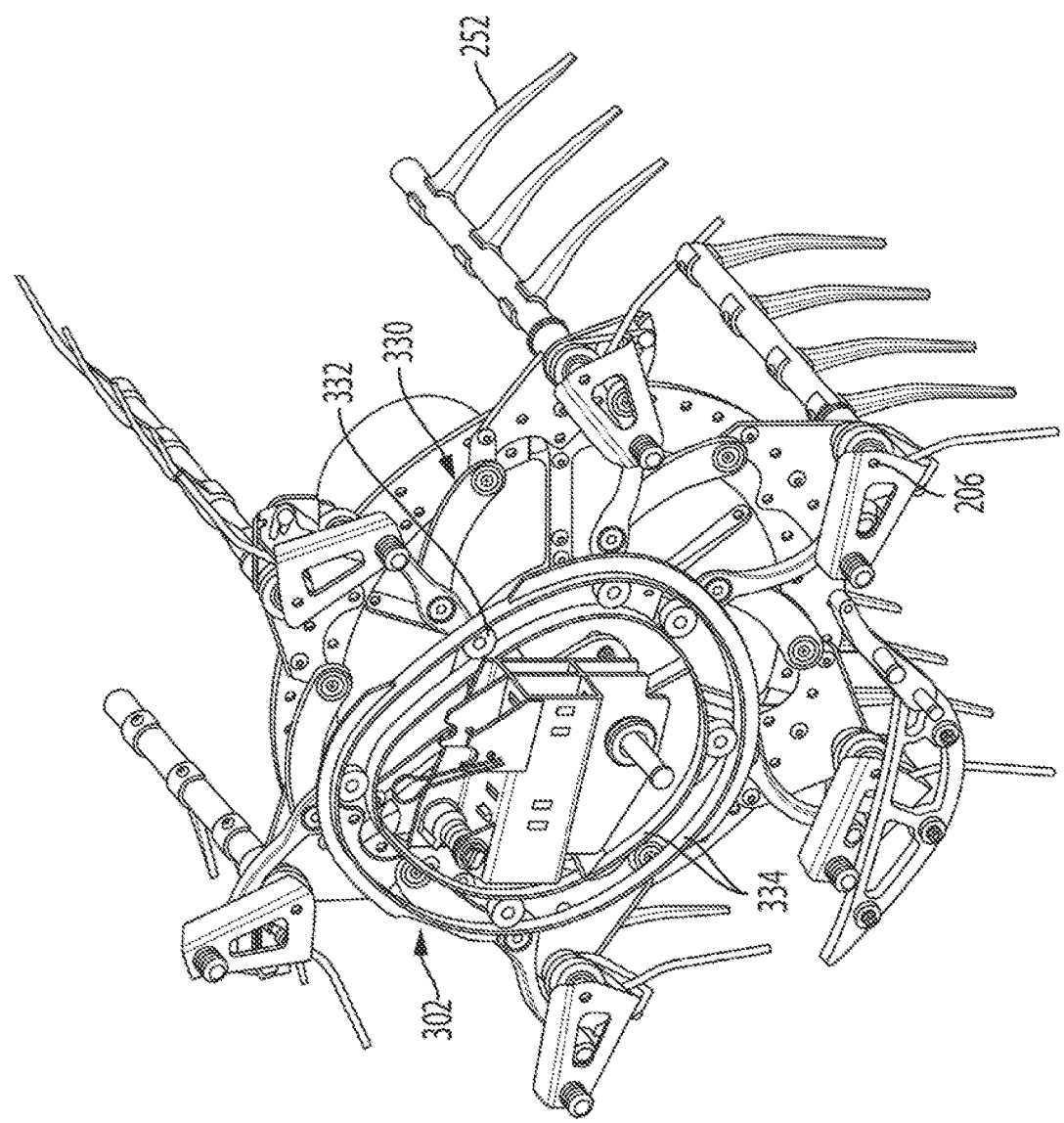
FIG. 3 is an external end view of a primary cam of a reel cam assembly of a harvester reel in accordance with an exemplary embodiment of the subject disclosure.

FIG. 3 shows a typical primary cam, such as primary cam 302. The non-circular shape of the primary cam dictates the degree to which the tine bars rotate during rotation of the central rotatable shaft 202, and thus the angle to which the tines 252 project from a circumference of the reel. In particular, each tine bar 206 has a respective linkage 330 that operatively links the tine bar with the primary cam 302. The linkage 330 includes a primary cam follower 332 that follows a cam track 334 of the primary cam as the reel rotates and moves the linkage 330 with respect to the tine bar so as to rotate the tine bar about its longitudinal axis, thereby changing the angle the tines project from a circumference defined by rotation of the reel about the central rotatable shaft.

Referring to FIGS. 4 and 5, the harvester reel 200 is shown rotating in the direction of arrows "R". The cam assembly 300 includes the primary cam 302 for guiding rotation of the tine bars 206 during rotation of the central rotatable shaft 202. In addition, the cam assembly 300 includes a secondary cam 304 moveable between a disengaged position (FIG. 4) and an engaged position (FIG. 5). The harvester reel 200 additionally comprises an actuator 306 for moving the secondary cam between the disengaged and engaged positions. The actuator 306 can be a pneumatic, hydraulic, servo, electromechanical, mechanical actuator and the like capable of moving at sufficient speed to deploy the secondary cam 304 to cam the tine bars 206 and thus the tines 252 out of contact with the cutterbar 110 as the cutterbar rises in relation to the harvester reel.

The actuator is operatively in communication or configured to operatively communicate with sensors 307 (FIG. 1) for detecting a position of the cutterbar 110 with respect to the harvester reel. In this way, the sensor communicates the position of the cutterbar with respect to the harvester reel. If the sensor detects that the cutterbar position is above a certain elevation or a predetermined elevation position, then the actuator is activated to move the secondary cam to the engaged position. In addition, the sensor 307 can be configured to communicate with the reel lift arm actuator 309 (FIG. 1) to raise the harvester reel relative to the cutterbar when the cutterbar reaches a certain elevation or a predetermined elevation position. Alternatively, the actuator, sensor and reel lift arm may be operatively in communication with a controller (e.g., a computer controller/processor on the harvester or header) configured to control operation thereof based on predetermined parameters.

The secondary cam 304 is illustrated as being movable between first and second positions relative to the harvester reel. Specifically, the secondary cam is pivotably connected at pivot 308 to an unillustrated plate that is attached to the primary cam 302. It is understood, however, that the secondary cam can be supported to move in a linear fashion between the disengaged and engaged positions. The secondary cam 304 is positioned about a bottom region of the reel to facilitate camming of the tine bars such that they are retracted away from or otherwise disengaged from the cutterbar as the cutterbar comes into close proximity with the tines as further described below.

The secondary cam 304 includes a camming surface 310. FIG. 4 illustrates the secondary cam in the disengaged position whereby the camming surface 310 is out of contact with the curved heads 258 of tine bar followers 254. FIG. 4 also depicts nine positional instances (1-9) of a single tine bar follower approaching and passing the secondary cam 304. Under these circumstances, the tine bar follower 254 does not contact the camming surface 310 of the secondary cam 304 and the tine bar 206 is cammed or moved as dictated by the primary cam 302. As shown in FIG. 4, in the region of the secondary cam 304, the primary cam 302 cams the tine bar 206 such that the tine 252 extends substantially radially outwardly from the perimeter of the harvester reel.

FIG. 5 illustrates the secondary cam 304 in the engaged position wherein the actuator moves the secondary cam radially outwardly and the follower 254 of at least one of the plurality of reel tine bars 206 cams against the secondary cam. In other words, the secondary cam engages the follower of at least one of the plurality of reel tine bars pivoting the reel tine bar about its longitudinal axis. FIG. 5 also depicts nine positional instances (1'-9') of a single tine bar follower approaching, contacting and engaging the secondary cam 304. Under these circumstances, the curved head 258 of the tine bar follower 254 contacts the camming surface 310 of the secondary cam 304 in positional instances 2'-7' and the tine bar 206 is cammed as dictated by the shape of the camming surface 310 during that interval. As shown, the camming surface gradually cams the follower 254 from a position whereby the tine 252 extends substantially radially outwardly from the perimeter of the harvester reel (positional instance 2') to a position whereby the tine extends substantially tangentially to the perimeter of the harvester reel (positional instance 6') or at an acute angle relative to the perimeter of the harvester reel, to an uncammed position whereby the tine extends substantially radially outwardly from the perimeter of the harvester reel (positional instances 8' and 9'). In other words, in the engaged position, the secondary cam 304 overcomes the bias of the biasing member 250 in positional instances 2'-7' of the tine bar follower 254 and returns control to the biasing member at positional instances 8' and 9' of the tine bar follower, whereby the tine bar 206 and thus the tines 252 return to positions dictated by the shape of the primary cam 302. In the cammed positions, the overall length in which the tine extends radially outwardly from the reel is decreased thereby increasing the spacing distance of the tine from the cuter bar to prevent accidental engagement by the cutterbar.

Figure 8:
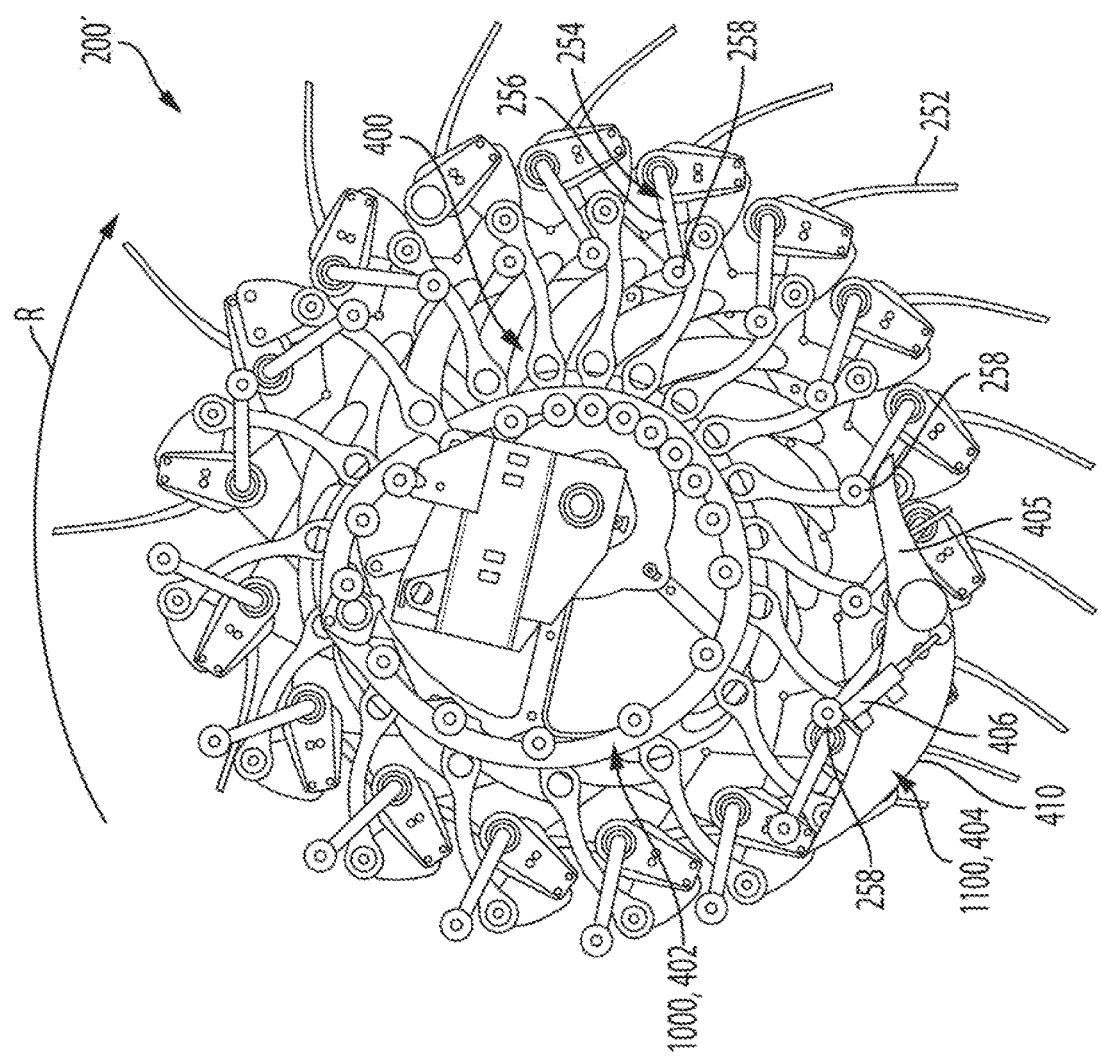
FIG. 8 is an external lateral end view of a diverter of a reel cam assembly of a harvester reel in accordance with another exemplary embodiment of the subject disclosure in a disengaged position.
Figure 10:
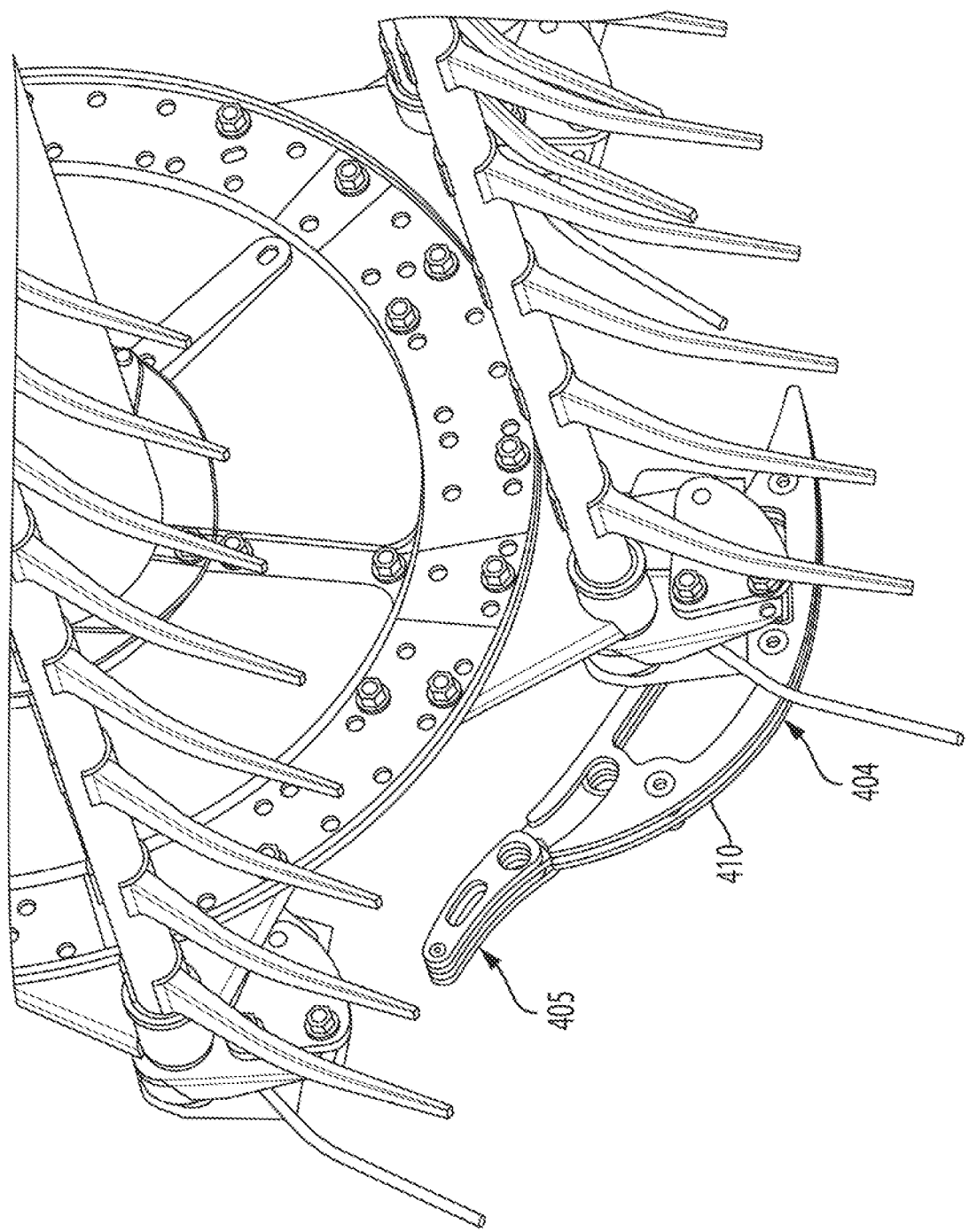
FIG. 10 is a partial perspective internal end view of the reel cam assembly of FIG. 9.
Figure 11:
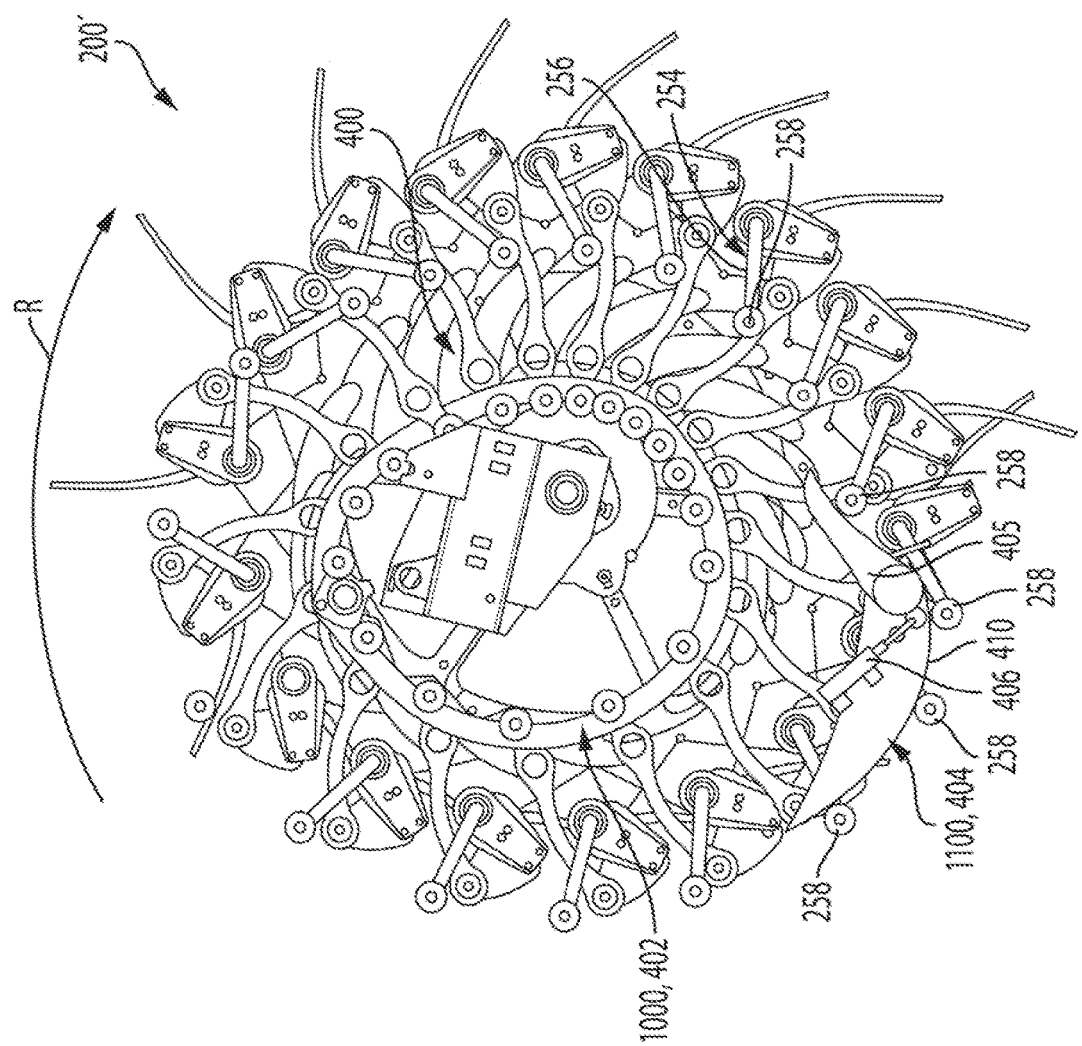
FIG. 11 is an external lateral end view of a diverter of a reel cam assembly of a harvester reel in accordance with another exemplary embodiment of the subject disclosure in an engaged position.
Figure 12:
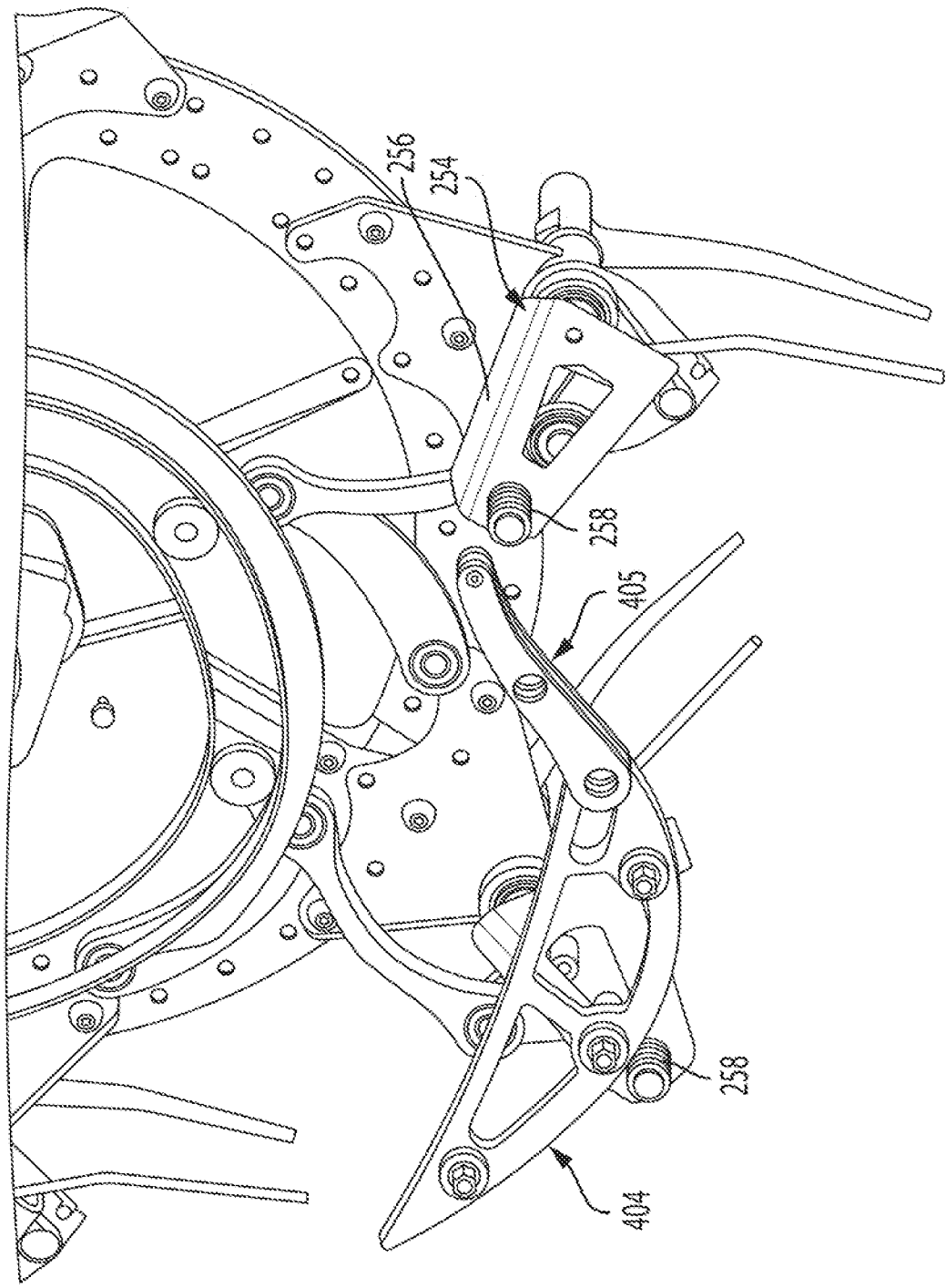
FIG. 12 is a partial enlarged external end view of the reel cam assembly of FIG. 11.
Figure 13:
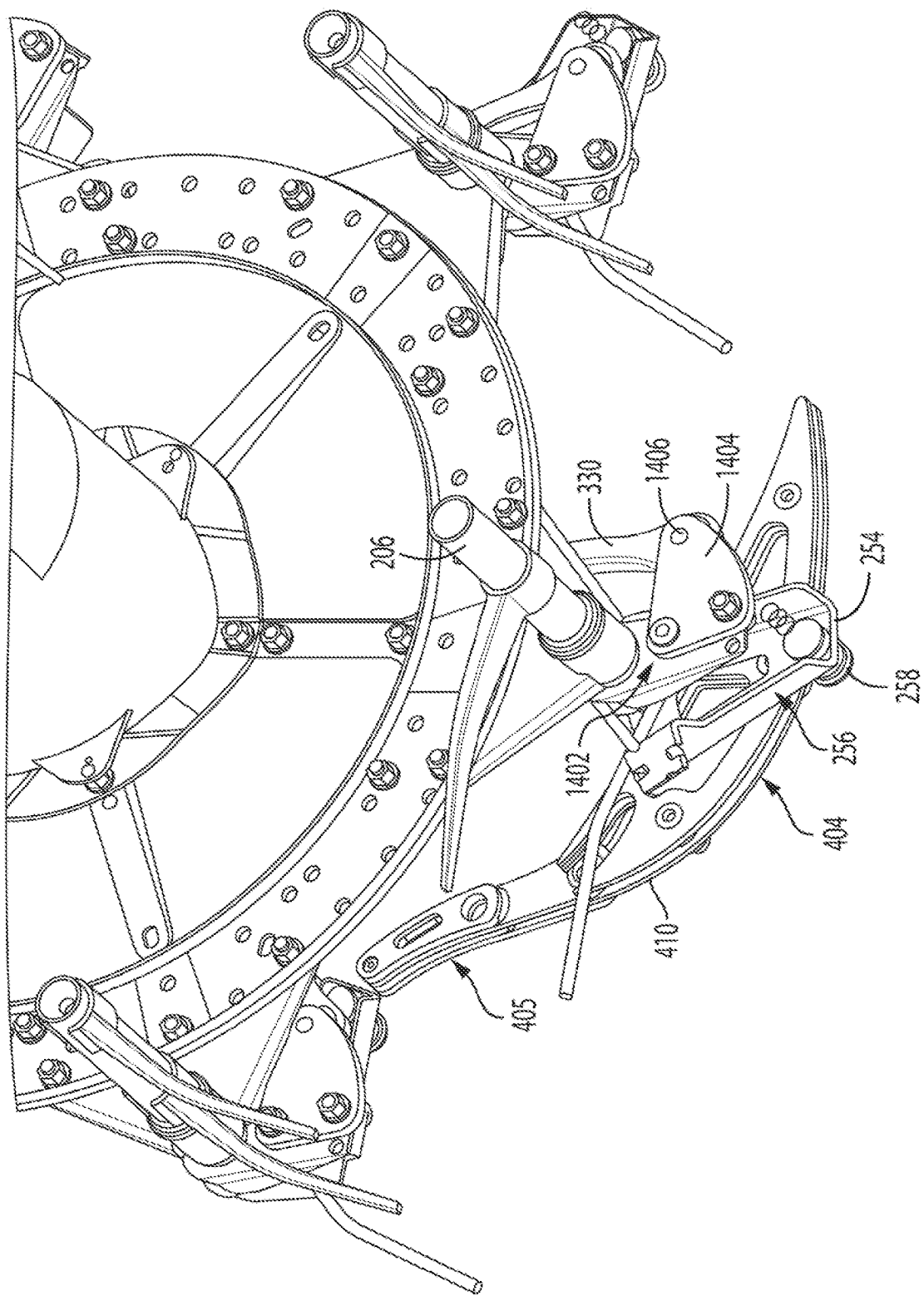
FIG. 13 is a perspective internal end view of the reel cam assembly of FIG. 12.

In accordance with another exemplary embodiment of the subject disclosure, FIGS. 8 and 11 illustrate a harvester reel 200' rotating in the direction of arrows "R", having a cam assembly 400. Cam assembly 400 includes a primary cam 402 similar to cam 302 for guiding rotation of the tine bars 206 during rotation of the central rotatable shaft 202. In addition, the cam assembly 400 includes a secondary cam 404 and a diverter 405 adjacent the secondary cam, wherein the diverter is moveable or pivotable between a disengaged position (FIGS. 8-10) and an engaged position (FIGS. 11-13). The secondary cam 404 and diverter 405 are positioned about a bottom region of the reel to facilitate camming of the tine bars such that they are disengaged or retracted as the cutterbar comes into close proximity with the tines as described below. The harvester reel 200' additionally comprises an actuator 406 (FIGS. 8 and 11) for moving the diverter between the disengaged and engaged positions. The actuator 406 can be a pneumatic, hydraulic, servo, electromechanical, mechanical actuator and the like capable of moving at sufficient speed to deploy the diverter to cam the tine bars 206 and thus the tines 252 out of potential contact with the cutterbar 110 as the cutterbar rises in relation to the harvester reel. Further details of actuator 406 are described with reference to FIGS. 14A-14C. The actuator is configured for operatively communicating with or operatively in communication with the sensor 307 (FIG.

1) for detecting a position of the cutterbar 110 with respect to the harvester reel. In this way, the sensor detects and communicates with the controller or the harvester operator the position of the cutterbar with respect to the harvester reel. If the sensor detects the cutterbar position is above a certain elevation or a predetermined position, then the actuator is activated to move the diverter to the engaged position. In addition, the sensor 307 can be configured to communicate with the reel lift actuator 309 (FIG. 1) such as a hydraulic cylinder or the like to raise the harvester reel relative to the cutterbar when the cutterbar reaches a certain elevation or a predetermined position.

Figure 9:
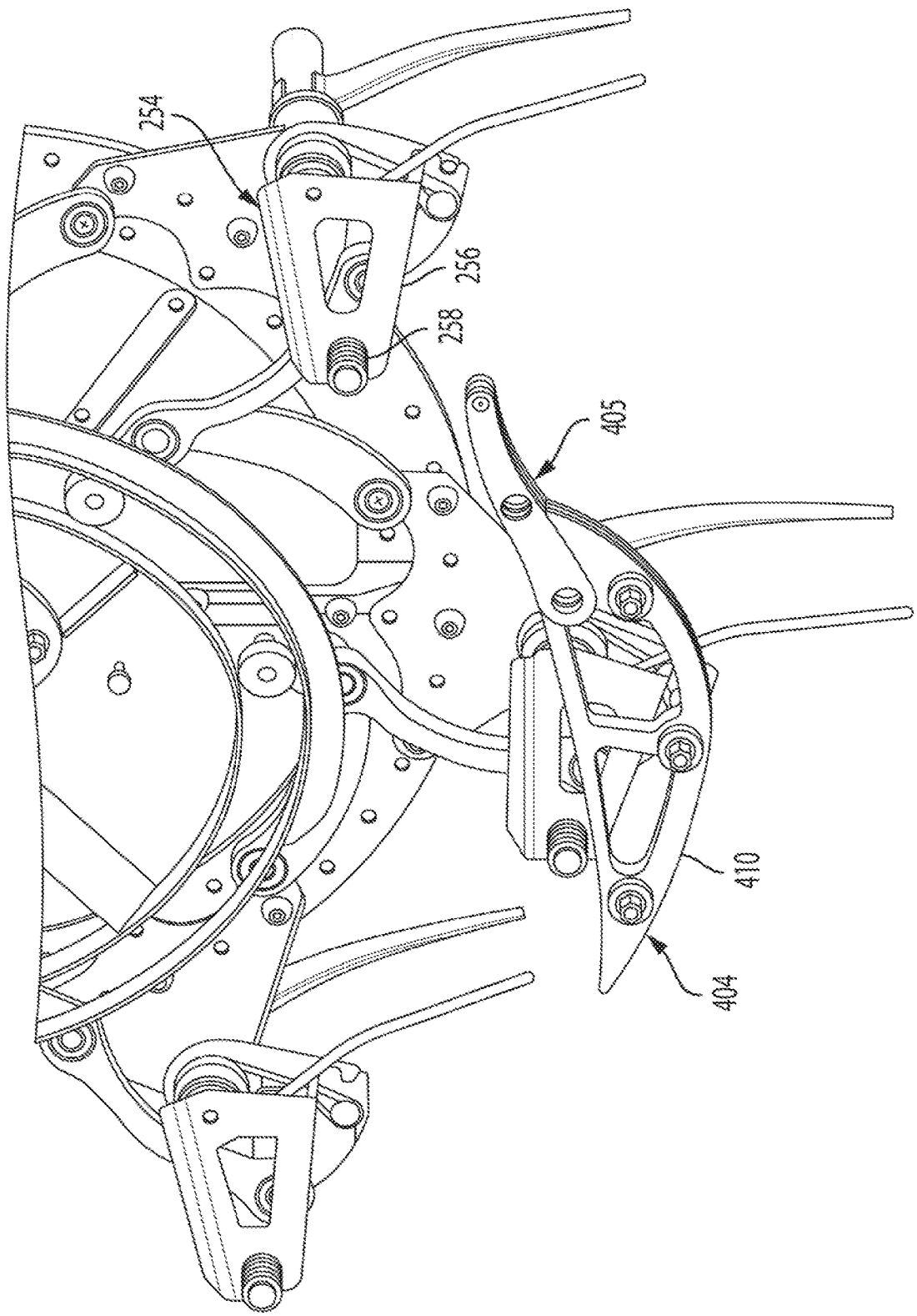
FIG. 9 is an enlarged lateral external end view of the reel cam assembly of FIG. 8.

The secondary cam 404 includes a camming surface 410 facing radially outwardly of the reel. FIGS. 8-10 illustrate the diverter 405 pivoted downwardly by the actuator 406 into the disengaged or non-engaging position whereby the diverter and the camming surface 410 are out of contact with the curved heads 258 of tine bar followers 254. In other words, the diverter is structured such that the curved heads of the tine bar followers pass by the diverter without engaging the diverter when the diverter is pivoted downwardly into the disengaged position. Under these circumstances, the tine bar follower 254 does not contact the diverter or the camming surface of the secondary cam and the tine bar 206 is cam med or moved as dictated by the shape of the primary cam 402. As shown in FIG. 8, in the region of the secondary cam 404, the primary cam 402 cams the tine bars such that the tines 252 extends substantially radially outwardly from the perimeter of the harvester reel.

FIGS. 11-13 illustrate the diverter 405 pivoted or moved upwardly into the engaged position wherein the follower 254 of at least one of the plurality of reel tine bars 206 contacts and cams against the diverter and the secondary cam upon rotation of the central rotatable shaft. In other words, the actuator 406 is operable to move or pivot the diverter from the disengaged or non-engaging position shown in FIGS. 8-10 to the engaged or engaging position of FIGS. 11-13 whereby the diverter engages the follower of at least one of the plurality of tine bars pivoting the tine bar about its longitudinal axis. Under these circumstances, the curved head 258 of the tine bar follower 254 contacts the upwardly pivoted diverter 405 and the camming surface 410 of the secondary cam 404 whereby the tine bar 206 is cammed as dictated by the shapes of the diverter 405 and the camming surface 410. As shown, the diverter and the camming surface gradually cam the follower 254 from a position whereby the tine 252 extends substantially radially outwardly from the perimeter of the harvester reel to a position whereby the tine extends substantially tangentially to the perimeter of the harvester reel or at an acute angle to the perimeter of the harvester reel. In other words, in the engaged position of the diverter 405, the diverter and the secondary cam 404 overcome the bias of the biasing member 250 to rotate the tine bars and thus move the tines 252 away from the cutterbar 110 creating a larger spacing between the tines and the cutterbar, thereby reducing or completely eliminating the potential for cutterbar engagement with the tines. When the diverter is returned to the disengaged position, the tine bar 206 and thus the tines 252 return under the bias of the biasing member to positions dictated by the shape of the primary cam 402.

Turning now to FIGS. 13-15C, those figures depict a latch 1400 for releasably coupling tine bar 206 of reel 200' to primary cam 402. Stated differently, latch 1400 is configured for releasably locking together (i) a follower bracket 256 extending from tine bar 206 and (ii) a rocker arm 1404 of linkage 330 that is connected to primary cam 402.

It is noted that various elements of latch 1400 are omitted in FIG. 13. It is further noted at the outset that the elements in FIGS. 14A-15C are shown schematically and may be depicted differently from the corresponding elements shown in FIG. 13, for example.

Figure 14C:
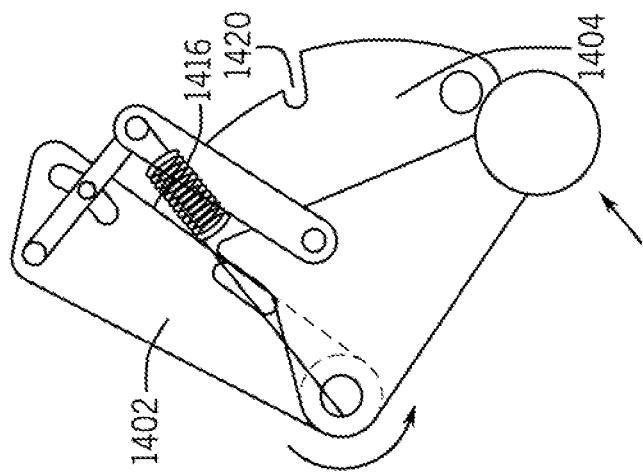
FIGS. 14A-14C are sequential schematic views depicting operation of a latch releasing the tine bar from the primary cam.
Figure 14B:
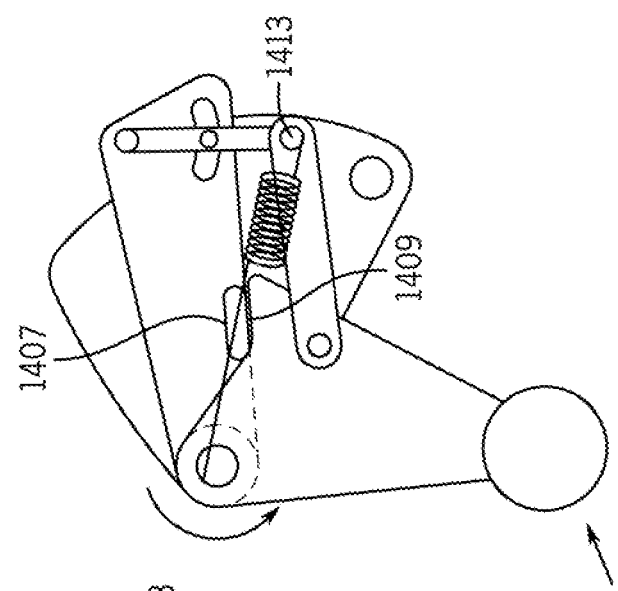
Figure 14A:
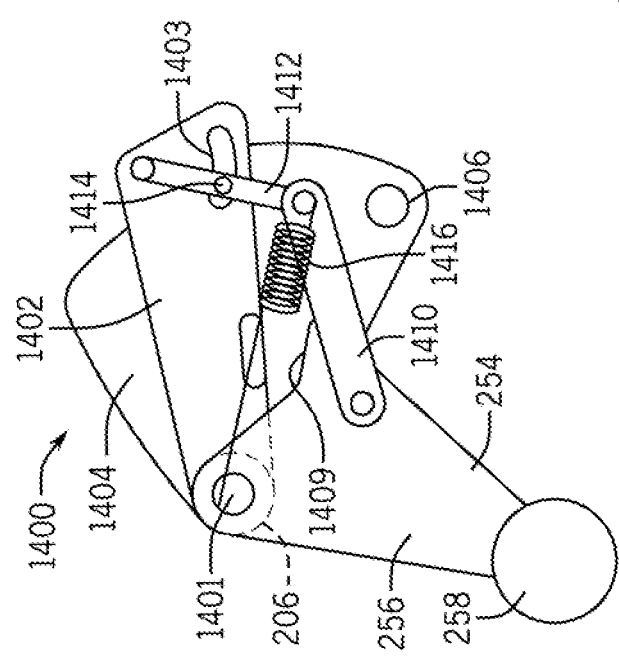

Turning now to FIGS. 13 and 14A, a bracket 1402 extends from and is fixedly connected to tine bar 206. The position of tine bar 206 in FIG. 14A is not limited to that which is shown and can vary. Linkage 330 generally includes a first end including cam follower 332 (see, e.g., FIG. 3) that follows cam track 334 of the primary cam 402 as the reel 200' rotates (as noted above), and a second end including a rocker arm 1404. Pivoting motion of rocker arm 1404 can cause rotation of tine bar 206 (depending upon the state of latch 1400), as will be described in greater detail below.

Turning now to FIG. 14A, tine bar bracket 1402 may be rotatably coupled to follower bracket 256 by a pin 1401, for example. Alternatively, those brackets do not have to be coupled to each other. Rocker arm 1404 may also be pivotably coupled at pin 1401 or a different pin as shown in FIG. 13. The pinned connections can vary. Bracket 1402 includes an elongated and (optionally) curved and closed-ended slot 1403. Slot 1403 is formed at the end of bracket 1402 that is opposite pin 1401. A stop 1407, in the form of a surface or bumper, is disposed on one side of the bracket 1402 for bearing against (i.e., physically contacting) a bearing surface 1409 of follower bracket 256.

Follower bracket 256 is connected to bracket 1402 by two links. More specifically, a first end of a first link 1410 is pivotably mounted at a point on follower bracket 256. The second end of link 1410 is pivotably mounted to a first end of a second link 1412 by a pin 1413. The second end of the second link 1412 remains free. A pin 1414, which is fixedly mounted to the center of second link 1412, is slideably positioned in slot 1403 of bracket 1402. A coiled tension spring 1416 has a first end that is mounted to pin 1401 (or other surface) and a second end that is mounted to a pin 1413. Links 1410, 1412 and brackets 256, 1402 together form a four-bar linkage.

As shown in FIG. 14C, rocker arm 1404 includes an elongated and open-ended slot 1420 that is sized for receiving pin 1414 in the latched position of latch 1400 (see FIG. 14A). Rocker arm 1404 also includes a hole 1406 (or other mounting means) to which linkage 330 (FIG. 13) is mounted.

Latch 1400 may be considered as forming part of the cam assembly comprising the primary and secondary cams. At a minimum, latch 1400 includes links 1410, 1412, and pin 1414. Latch 1400 may or may not be considered to include brackets 256 and 1402 as well as rocker arm 1404. It should be understood that latch 1400 is not limited to the pin and slot arrangement shown in the figures. For example, the pin and slot could be replaced with a clip, clamp, fastener, lock, surface, ramp, etc.

Latch 1400 is useful for preventing inadvertent rotation of tine bar 206 due to crop forces during operation. More particularly, in the embodiment of FIGS. 8-15C, tine bar bracket 1402 is rotated by secondary cam 404 in a counter-clockwise direction (relative to rocker arm 1404 in FIG. 14A) that is also counter to the direction of the reel rotation R (see FIG. 8). Tine bar spring 250 is biased to rotate tine bar bracket 1402 as well as follower bracket 256 in a clockwise direction (relative to rocker arm 1404 in FIG. 14A) to return follower bracket 256 to its regular uncammed position once follower bracket 256 clears secondary cam 404. Locking tine bar 206 during normal operation prevents inadvertent counterclockwise rotation of tine bar 206 and its follower bracket 256 so that tines 252 follow the path shown in FIG. 8. In the absence of latch 1404 or an excessively large spring 250, an uncammed tine bar 206 could inadvertently rotate in a counterclockwise direction due to crop forces experienced during normal operation, which could potentially impede the effectiveness of the reel during normal operation.

Figure 15C:
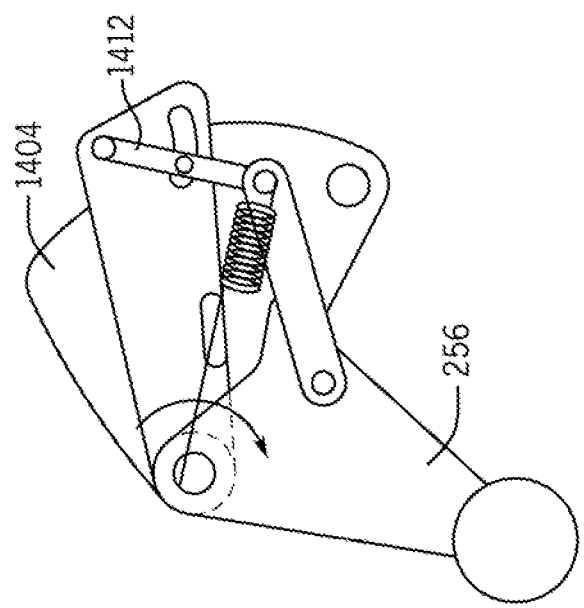
FIGS. 15A-15C are sequential schematic views depicting the latch of FIGS. 14A-14C locking the tine bar to the primary cam.
Figure 15B:
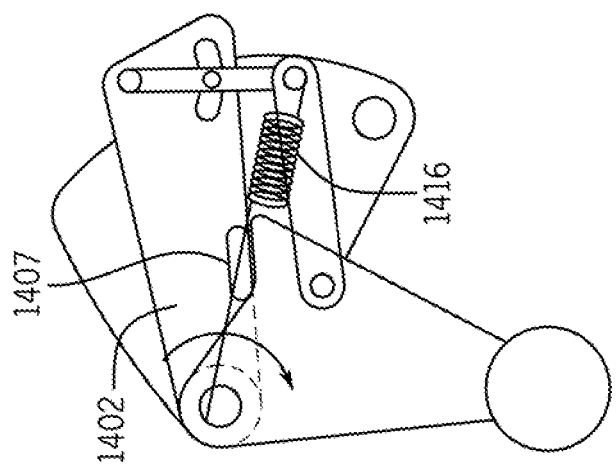
Figure 15A:
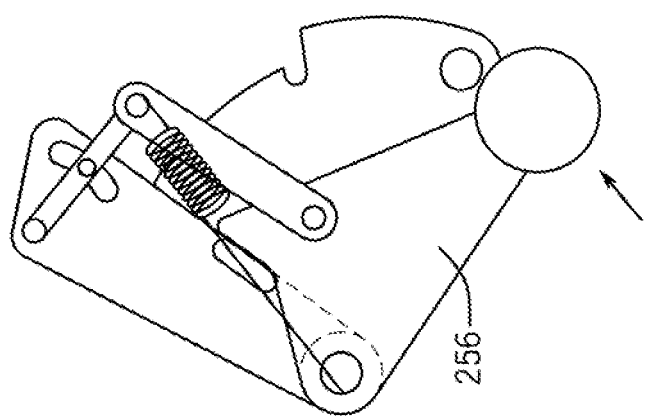

Turning now to operation of latch 1400, FIGS. 14A-14C are sequential schematic views depicting operation of a latch releasing the tine bar 206 from the primary cam 402. And, FIGS. 15A-15C are sequential schematic views depicting the latch of FIGS. 14A-14C locking the tine bar to the primary cam.

Starting from the locked/latched position/configuration of latch 1400 shown in FIG. 14A, pin 1414 is positioned within the slot 1420 of rocker arm 1404, thereby locking together tine bar bracket 1402, tine bar 206, rocker arm 1404 and linkage 330. Because tine bar 206 and rocker arm 1404 are fixed together in the locked position of latch 1400, rotation of tine bar 206 is controlled by the primary cam 402 (by way of rocker arm 1404 and linkage 330).

Turning now to FIG. 14B, when roller head 258 initially contacts diverter 405, follower bracket 256 is pivoted by a first amount against the bias of spring 1416 thereby releasing a pin-slot engagement between pin 1414 and cam slot 1420. Specifically, follower bracket 256 moves in a counterclockwise motion, which causes link 1410 to move to the right (as viewed in FIG. 14B), which causes link 1412 to move to the right (and/or pivot counterclockwise about pin 1413), and which causes pin 1414 (which may be fixed to link 1412) to move to the right and exit slot 1420. It is noted that a predetermined misalignment between the two contact surfaces at the pin-slot joint causes pin 1414 to slide out of slot 1420. The predetermined misalignment counters any crop forces that may add friction to that joint.

Once pin 1414 exits slot 1420 (as shown in FIG. 14B), tine bar 206, tine bar bracket 1402 and follower bracket 256 are released from and can move relative to rocker arm 1404, linkage 330 and primary cam 402. At this stage, follower bracket 256 has rotated counterclockwise, as dictated by the shape of diverter 405, to a position whereby surface 1409 bears against stop 1407. However, at this stage, follower bracket 256 has not (yet) rotated bracket 1402.

Turning now to FIGS. 14C and 15A, roller head 258 continues to travel along the path defined by diverter 405 and secondary cam 404, which causes follower bracket 256 to be pivoted in the same direction by a further amount. Because surface 1409 bears against stop 1407, rotation of follower bracket 256 causes rotation of bracket 1402 in the counterclockwise direction and against the bias of spring 250. Rotation of bracket 1402 results in rotation of tine bar 206 in a counterclockwise direction, which prevents contact between the tines 252 of tine bar 206 and the cutterbar, as was described above. Links 1410 and 1412 translate and/or rotate along with bracket 1402. Because tine bar bracket 1402 is released from rocker arm 1404, rotation of tine bar 206 does not result in rotation of rocker arm 1404.

Turning now to FIG. 15B, after the reel 200' has rotated sufficiently for the tines 252 to fully clear the cutterbar, the roller head 258 approaches the end of the track of secondary cam 404. The end of the roller track coincides with the "release point" in the reel rotation. This is the point during normal operation where the primary cam 402 retracts the tines 252 to release crop onto the belts of the header. As the roller head 258 exits its track, spring 250 urges tine bar and bracket 256 in the clockwise direction (as shown by the arrow in FIG. 15B) until the pin 1414 registers with slot 1420 on the rocker arm 1404.

Turning to FIG. 15C, spring 1416 snaps pin 1414 into the slot 1420, thereby re-establishing the mechanical connection between the tine bar 206 and the rocker arm 1404. At the same time, spring 1416 urges bracket 256 in the clockwise direction (as shown by the arrow in FIG. 15C) until bracket 256 reaches the position shown in FIG. 15C. The configuration shown in FIG. 15C is the same as that shown in FIG. 14A. As noted above, in this configuration, bracket 256 and its roller head 258 are prevented from moving relative to rocker arm 1404. And, in the locked position of latch 1400, rotation of tine bar 206 is controlled by the primary cam 402 (by way of rocker arm 1404 and linkage 330).

It should be understood that the sequence shown in FIGS. 14A-15C occurs only during momentary tine retraction and occurs for each tine bar 206 as the reel 200' rotates past the cutterbar.

Latch 1400 is an optional component that may be used with the reel 200' of FIGS. 8-13. Although only one latch 1400 is shown, it should be understood that each tine bar 206 may include its own latch 1400.

FIGS. 16A-16D illustrate sequential schematic views of the operation of a tine bar 206 in accordance with an exemplary embodiment of the subject disclosure as a cutterbar 110 approaches and moves away from a harvester reel.

Figure 16D:
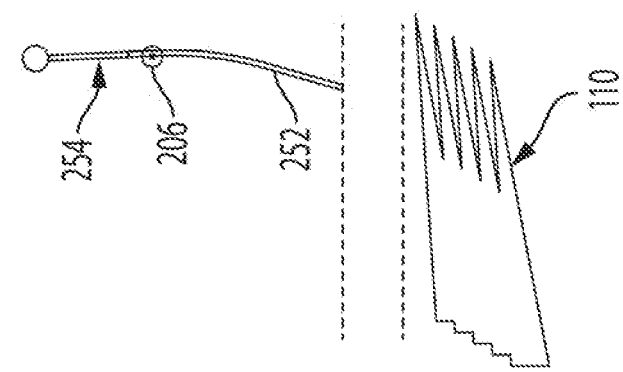
FIGS. 16A-16D are sequential schematic views of the operation of a tine bar in accordance with an exemplary embodiment of the subject disclosure as a cutterbar approaches and moves away from a harvester reel carrying the tine bar.
Figure 16C:
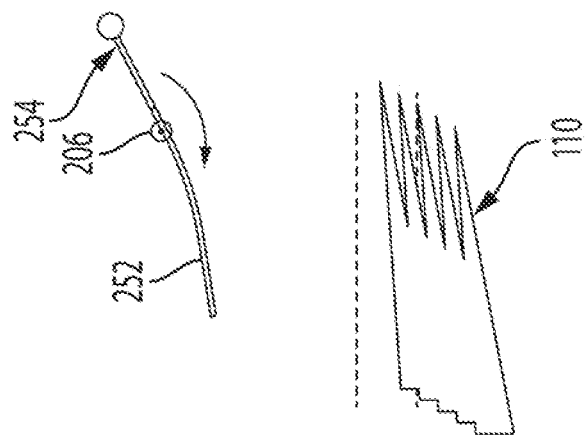
Figure 16B:
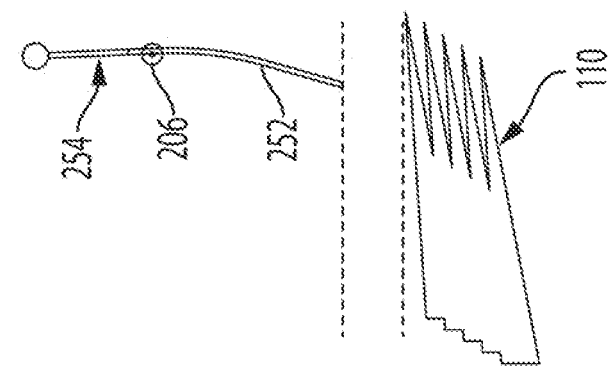
Figure 16A:
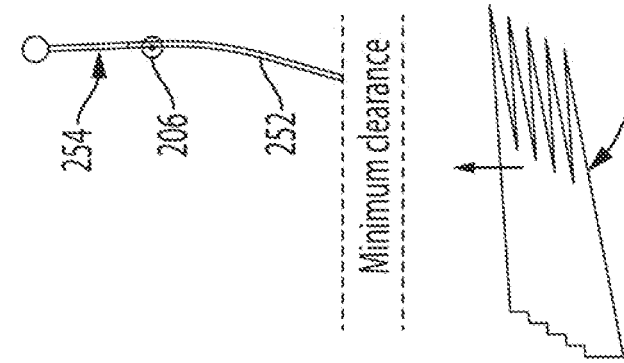

Referring to FIG. 16A, the cutterbar 110 is shown rising in relation to an unillustrated harvester reel but has not yet reached a minimum clearance with respect to the harvester reel. In the state shown in FIG. 16A, the tine bar 206 extends as dictated by the shape of a primary cam of the harvester reel.

Referring to FIGS. 16B and 16C, at least a portion of the cutterbar 110 reaches a minimum clearance or a predetermined clearance position with respect to the harvester reel as determined by sensor 307. As the cutter bar moves through the minimum clearance zone, the sensor 307 communicates with a controller, which communicates with an actuation system to extend a secondary cam (FIGS. 4 and 5) or a diverter 405 (FIGS. 8-15C) into contact with a follower 254 of the tine bar 206. At this juncture, the secondary cam rotates the tine bar against the bias of biasing member to a retracted position whereby the tines 252 retract with respect to the cutterbar 110 so as to avoid contact therewith. Also, at this juncture, the controller/processor/computer records the vertical position of cutterbar 110 in memory, i.e., the position of cutterbar 110 once it crossed the minimum clearance zone. This position may be referred to as an 'engage' position. The 'engage' position will be used later as a reference to establish the 'reset' position.

Referring to FIG. 16D, as the cutterbar 110 moves downwardly and away from tines, and eventually reaches the previously recorded 'engage' position (as determined by sensor(s) 307), the sensor 307 communicates with controller/processor which communicates with an actuation system to reset the tines by retracting the secondary cam or the diverter out of contact with the follower 254 of the tine bar 206. At this juncture, the biasing member biases the tine bar to rotate such that the tines 252 return to an engaged (i.e., deployed) position dictated by the primary cam. The tines may be reset based solely on the rotated position of the flex arms 111 recorded by sensor(s) 307. The previously recorded 'engage' position may be permanently stored in memory, or, alternatively, the previously recorded 'engage' position may be overwritten by the next recorded engage position such that each recorded engage position is a newly saved baseline value.

Alternatively, the controller/processor may also calculate the downward velocity or acceleration of cutterbar 110, and reset the tines to the engaged position once (i) the cutterbar 110 reaches the previously recorded 'engage' position, and (ii) the downward velocity or acceleration of cutterbar 110 exceeds a predetermined threshold.

As another alternative, the controller/processor may reset the tines to the engaged position once the downward velocity or acceleration of cutterbar 110 exceeds a predetermined threshold.

FIGS. 17A-17D illustrate sequential schematic views of the operation of a tine bar 206 in accordance with another exemplary embodiment of the subject disclosure as a cutterbar 110 approaches and moves away from a harvester reel.

Figure 17D:
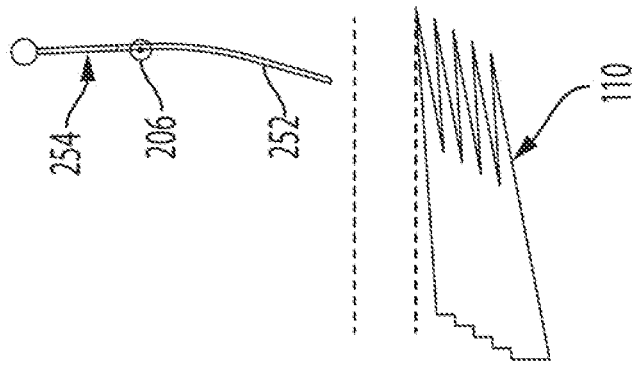
FIGS. 17A-17D are sequential schematic views of the operation of a tine bar in accordance with another exemplary embodiment of the subject disclosure as a cutterbar approaches and moves away from a harvester reel carrying the tine bar.
Figure 17C:
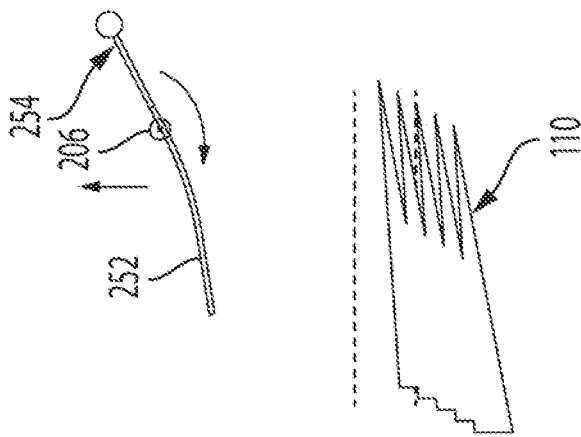
Figure 17B:
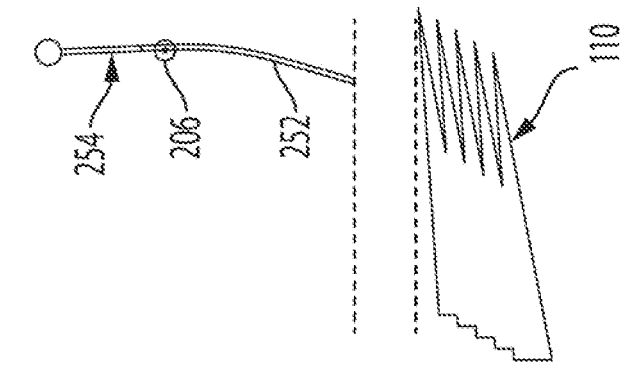
Figure 17A:
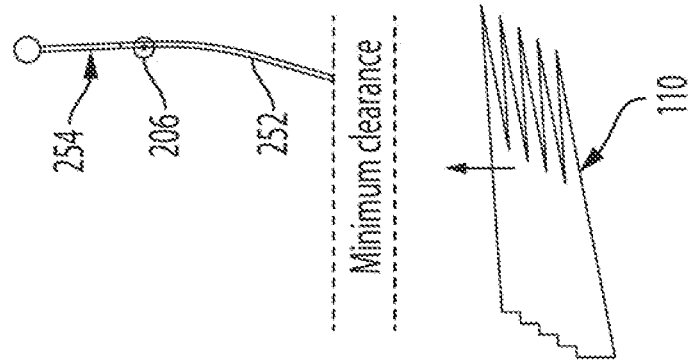

Referring to FIG. 17A, the cutterbar 110 is shown rising in relation to an unillustrated harvester reel but has not yet reached a minimum clearance with respect to the harvester reel. In the state shown in FIG. 17A, the tine bar 206 extends as dictated by the shape of a primary cam of the harvester reel.

Referring to FIGS. 17B and 17C, the cutterbar 110 reaches a minimum clearance or a predetermined clearance position with respect to the harvester reel as determined by a sensor 307. As the cutter bar moves through the minimum clearance zone, the sensor 307 communicates with an actuation system to extend a secondary cam (FIGS. 4 and 5) or a diverter 405 (FIGS. 8-15C) into contact with a follower 254 of the tine bar 206. At this juncture, the secondary cam rotates the tine bar against the bias of biasing member such that the tines 252 retract with respect to the cutterbar so as to avoid contact therewith. Concurrently, the sensor 307 may communicate with a reel lift actuator (FIG. 1) to raise the harvester reel relative to the cutterbar.

Referring to FIG. 17D, the reel itself may be raised thereby raising the minimum clearance zone itself if the cutterbar remains elevated due to e.g., an engaged expanse of raised ground. In that event, the reel remains raised until the sensor 307 and/or controller determines it is safe to extend the tines. Once the sensor 307 and/or controller determines it is safe to extend the tines, e.g., as the cutterbar 110 can be moved downwardly out of the minimum clearance zone, the sensor 307 communicates with an actuation system to retract the secondary cam or the diverter out of contact with the follower 254 of the tine bar 206. At this juncture, the biasing member biases the tine bar to rotate such that the tines 252 return to an engaged position dictated by the primary cam.

The computer described herein includes one or more of a processor, controller, and memory. It is to be understood that the operational steps described herein are performed by the computer upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computer described herein is implemented in software code or instructions which are tangibly stored on a tangible computer readable medium. Upon loading and executing such software code or instructions by the computer, the computer may perform any of the functionality of the computer described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

What is claimed is:

1. A harvester reel for an agricultural harvester header comprising:
   (i) a central rotatable shaft;
   (ii) a reel tine bar extending widthwise across the reel and connected to the central rotatable shaft for rotation therewith, the reel tine bar including a biasing member for biasing the reel tine bar to rotate about its central longitudinal axis, a follower operatively connected to the reel tine bar, and a tine; and
   (iii) a cam assembly including:
      a primary cam,
      a linkage having a first end that is connected to the primary cam and a second end that is configured to be releasably connected to the tine bar for guiding rotation of the tine bar about its central longitudinal axis during rotation of the central rotatable shaft,
      a latch for releasably connecting said second end of the linkage to the tine bar, wherein in an unlatched configuration of the latch, the reel tine bar can pivot relative to the second end of the linkage, and in a latched configuration of the latch, the reel tine bar is non-rotatably connected to the second end of the linkage, and
      a secondary cam having a surface that is configured to be contacted by the follower of the reel tine bar, wherein upon contacting the secondary cam, the follower moves the latch from the latched configuration to the unlatched configuration.

2. The harvester reel of claim 1, wherein the latch comprises one or more links interconnecting the follower to the reel tine bar, and a pin extending from one of the links that is connected to the reel tine bar.

3. The harvester reel of claim 2, wherein the second end of the linkage forms a rocker arm having a rocker arm slot, wherein, in the unlatched configuration of the latch, the pin is not positioned in the rocker arm slot such that the reel tine bar and the rocker arm are disconnected and rotatable with respect to one another, and in the latched configuration of the latch, the pin is positioned in the rocker arm slot such that the reel tine bar and the rocker arm are non-rotatably connected together.

4. The harvester reel of claim 3, wherein the reel tine bar includes a reel tine bar slot in which the pin is movably positioned, wherein the pin is positioned in the reel tine bar slot in both the latched and unlatched configurations of the latch, and wherein the reel tine bar slot is disposed on a bracket extending from the reel tine bar.

5. The harvester reel of claim 3, wherein the latch further comprises a spring mounted to one of the links for biasing the pin toward the rocker arm slot.

6. The harvester reel of claim 3, wherein when the pin is positioned in the rocker arm slot, the rocker arm is fixed to the tine bar, and when the pin is not positioned in the rocker arm slot, the rocker arm is not fixed to the tine bar.

7. The harvester reel of claim 1, wherein the follower is configured to rotate relative to the tine bar until the follower contacts the tine bar.

8. The harvester reel of claim 1 further comprising a diverter adjacent the secondary cam, wherein the diverter is movable between a disengaged position and an engaged position, wherein in the engaged position, the follower of at least one of the plurality of reel tine bars cams against the secondary cam.

9. The harvester reel of claim 8 further comprising an actuator for moving the diverter between the disengaged and engaged positions.

10. The harvester reel of claim 1, wherein in the disengaged position, the follower of at least one of the plurality of reel tine bars does not cam against the secondary cam.

11. The harvester reel of claim 1 further comprising multiple reel tine bars extending widthwise across the reel and connected to the central rotatable shaft for rotation therewith.

12. An agricultural harvester header comprising:
   the harvester reel of claim 1; and
   a cutterbar arranged below the harvester reel.

13. An agricultural harvester comprising the agricultural harvester header of claim 12.

14. A harvester reel for an agricultural harvester header comprising:
   (i) a reel tine bar extending widthwise across the reel, the reel tine bar including a follower operatively connected to the reel tine bar, and a tine; and
   (ii) a cam assembly including:
      a primary cam,
      a linkage having a first end that is connected to the primary cam and a second end that is configured to be connected to the tine bar for guiding rotation of the tine bar about its central longitudinal axis,
      a latch for selectively coupling said second end of the linkage to the tine bar, wherein in an unlatched configuration of the latch, the reel tine bar can pivot relative to the second end of the linkage, and in a latched configuration of the latch, the reel tine bar is non-rotatably connected to the second end of the linkage, and
      a secondary cam having a surface that is configured to be contacted by the follower of the reel tine bar, wherein upon contacting the secondary cam, the follower moves the latch from the latched configuration to the unlatched configuration.

15. The harvester reel of claim 14, wherein the latch comprises one or more links interconnecting the follower to the reel tine bar, and a pin extending from one of the links that is connected to the reel tine bar.

16. The harvester reel of claim 15, wherein the second end of the linkage forms a rocker arm having a rocker arm slot, wherein, in the unlatched configuration of the latch, the pin is not positioned in the rocker arm slot such that the reel tine bar and the rocker arm are disconnected and rotatable with respect to one another, and in the latched configuration of the latch, the pin is positioned in the rocker arm slot such that the reel tine bar and the rocker arm are non-rotatably connected together.

17. The harvester reel of claim 16, wherein the reel tine bar includes a reel tine bar slot in which the pin is movably positioned, wherein the pin is positioned in the reel tine bar slot in both the latched and unlatched configurations of the latch, and wherein the reel tine bar slot is disposed on a bracket extending from the reel tine bar.

18. An agricultural harvester header comprising:
the harvester reel of claim 14; and
a cutterbar arranged below the harvester reel.

19. An agricultural harvester comprising the agricultural harvester header of claim 18.

* * * * *